US007120112B1

United States Patent
Metzger et al.

(10) Patent No.: US 7,120,112 B1
(45) Date of Patent: Oct. 10, 2006

(54) REDUNDANCY IN MEDIA STREAM PROCESSING

(75) Inventors: Michael M. Metzger, Costa Mesa, CA (US); Jonathan Peace, Carlsbad, CA (US); Thomas H. Eichenberg, Modjeska Canyon, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 1000 days.

(21) Appl. No.: 10/154,278

(22) Filed: May 23, 2002

(51) Int. Cl.
*H04J 1/16* (2006.01)
(52) U.S. Cl. ...................... 370/219; 370/242
(58) Field of Classification Search ............... 370/216, 370/217, 219, 220, 221, 225, 229, 235, 237, 370/218, 242; 709/105
See application file for complete search history.

(56) References Cited

U.S. PATENT DOCUMENTS

| 5,978,381 A * | 11/1999 | Perlman et al. ............ 370/432 |
| 6,108,300 A * | 8/2000 | Coile et al. ................. 370/217 |
| 6,252,878 B1 * | 6/2001 | Locklear et al. ............ 370/401 |
| 2002/0116715 A1 * | 8/2002 | Apostolopoulos ............ 725/86 |

* cited by examiner

*Primary Examiner*—Brenda Pham
(74) *Attorney, Agent, or Firm*—Thomas, Kayden, Horstemeyer & Risley, LLP

(57) ABSTRACT

Various media stream processing systems and methods are provided. In one exemplary embodiment, a media stream processing method is provided that includes the brokering of a number of communications channels between a communications network and a packet switched network with a number of media stream processors. Each of the communications channels is specified by a profile having a number of channel parameters. The method also includes storing each of the profiles in a standby media stream processor when each of the media stream processors is operational. Finally, the method includes brokering respective ones of the communications channels originally brokered by one of the media stream processors with the standby media stream processor upon a failure of the one of the media stream processors.

32 Claims, 4 Drawing Sheets

REDUNDANCY IN MEDIA STREAM PROCESSING

TECHNICAL FIELD

The present invention is generally related to the field of networking and, more particularly, is related to redundancy in media stream processing in networks.

BACKGROUND

For telecommunications and other networking providers, network reliability is important. In most situations, carrier class equipment such as network switches should be operational 99.999% of the time such equipment is employed with a network. If equipment fails, customers telephone calls can be dropped, data can be corrupted, and the service provider suffers in the eyes of the consumer.

Currently, media stream processors are now being produced that can handle thousands of telephone calls or other data streams at the same time. This means that a failure in such processors can result in the loss of hundreds if not thousands of telephone calls or data streams. As such, redundancy may be employed to ensure that this does not happen. Unfortunately, full redundancy is still quite expensive for those carriers that have a large number of switches to upgrade. Also, given that a large number of telephone calls or other media streams that are facilitated by a single switch, it takes an unacceptably long period of time to switch all active calls or data streams to a redundant switch upon failure of a primary switch.

SUMMARY

In view of the foregoing, the present invention provides for various media stream processing systems and methods. In one exemplary embodiment, a media stream processing method is provided, comprising brokering of a number of communications channels between a communications network and a packet switched network with a number of media stream processors, wherein each of the communications channels is specified by a profile having a number of channel parameters. The method also includes storing each of the profiles in a standby media stream processor when each of the media stream processors is operational, and, brokering respective ones of the communications channels originally brokered by one of the media stream processors with the standby media stream processor upon a failure of the one of the media stream processors.

In another embodiment, a media stream processing system is provided that comprises a number of media stream processors, each of the media stream processors being configured to broker a number of communications channels between a communications network and a packet switched network, each of the communications channels including a profile having a number of channel parameters. The media stream processing system also includes a standby media stream processor associated with the media stream processors, the standby media stream processor having a standby mode in which the standby media stream processor maintains the profile for each of the communications channels, and, the standby media stream processor having an active mode in which the standby media stream processor stands in for one of the media stream processors to broker the communications channels brokered thereby upon a failure of the one of the media stream processors.

There are other features of the present invention that will become apparent to a person with ordinary skill in the art in view of the following drawings and detailed description. In addition, various advantages are obtained from the present invention as will also be apparent to those with ordinary skill in the art. It is intended that all such additional features and advantages be included herein within the scope of the present invention.

BRIEF DESCRIPTION OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
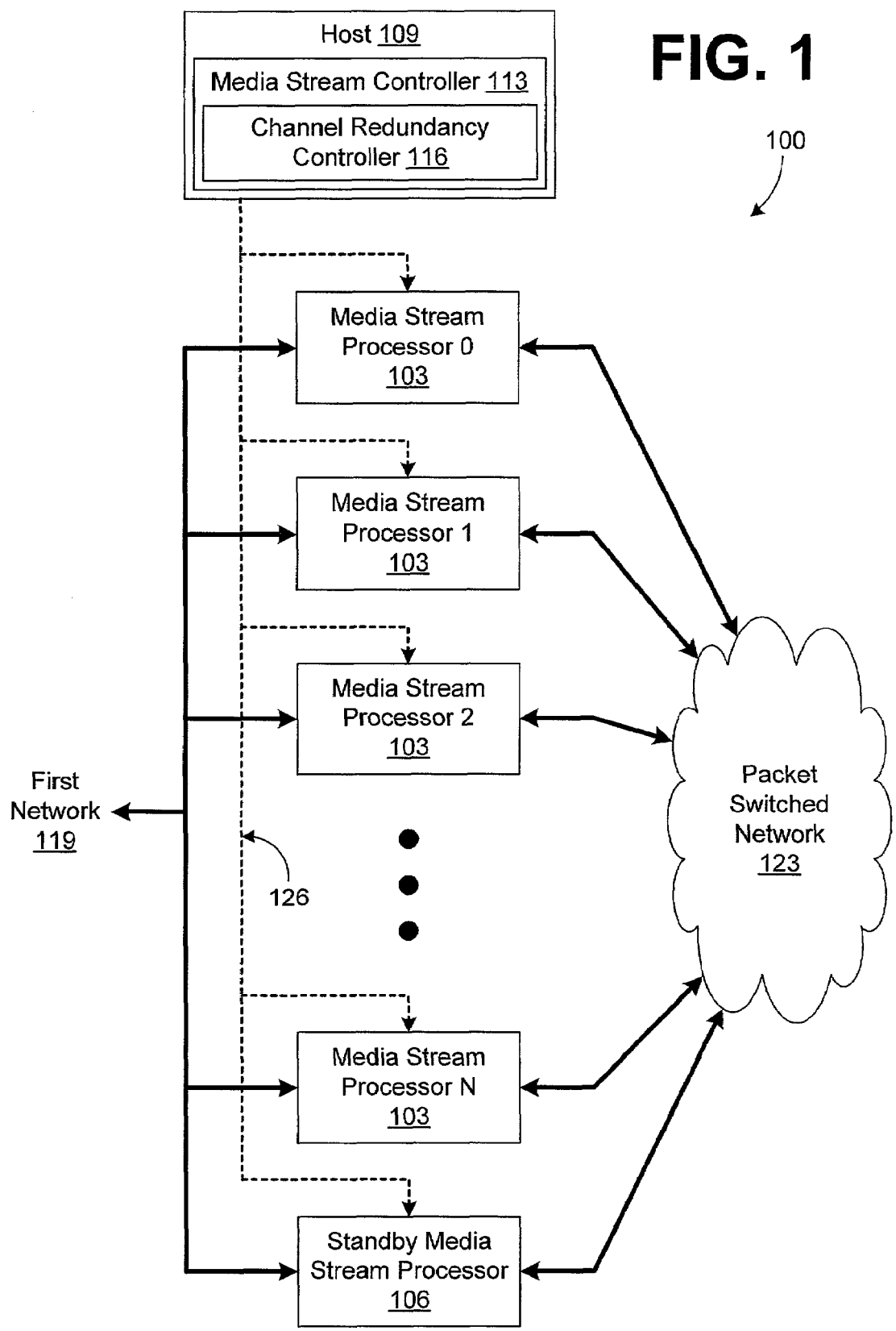
FIG. 1 is a block diagram of a media stream processing system according to an embodiment of the present invention.

With reference to FIG. 1, shown is a media stream processing system 100 according to an embodiment of the present invention. The following discussion begins with a description of the physical makeup of the media stream processing system 100 followed by a discussion of the operation of the same. The media stream processing system 100 includes a number of media stream processors 103 and at least one standby media stream processor 106 that is associated with the media stream processors 103. Each of the media stream processors 103 and the standby media stream processor 103 may comprise, for example, one or more integrated circuits or application specific integrated circuits (ASICs) having one or more processing engines and/or dedicated logical circuitry. The media stream processing system 100 also includes a host 109 upon which is implemented a media stream controller 113. The host 109 may be, for example, a processor-based system or other system with like capability. A portion of the media stream controller 113 comprises a channel redundancy controller 116.

The media stream processors 103 and the standby media stream processor 106 are all coupled between a first network 119 and a packet switched network 123. The first network 119 may be any network such as, for example, a time division multiplexing (TDM) network, packet switched network, or other type of network. The first network 119 may be employed to relay voice signals from a source to a desired destination. Regardless of the form of the voice signal as it is received, for example, by one of the media stream processors 103, it is translated into packets and sent to a destination address on the packet switched network 123. Likewise, a return voice signal that is received from the destination address is translated into the format accepted by the first network 119 and relayed to the source such as is the case with a telephone call. In this sense, each of the media stream processors 103 and the standby media stream processor 106 facilitate Voice Over Packet (VoP) communication.

Assume, for example, that the first network 119 is a TDM network. In such case, the input/output coupling of the media stream processors 103 and the standby media stream processors 106 to the first network 119 may be a TDM bus as can be appreciated by those with ordinary skill in the art. The first network 119 may also be a type of network other than a TDM bus. The packet switched network 123 may be, for example, and Internet Protocol (IP) network, an Asynchronous Transfer Mode (ATM) network, or other packet switched network as can be appreciated by those with ordinary skill in the art. The host 109 is in data communication with each of the media stream processors 103 and the standby media stream processor 106 by virtue of a control bus 126.

During operation, the media stream processing system 100 employs the media stream processors 103 to handle media streams such as, for example, telephone calls or data communication, etc. The media stream controller 113 in the host 109 controls the overall operation of the media stream processors 103 and the standby media stream processor 106 by directing the set-up of active communications channels within the media stream processors 103 and the standby media stream processor 106 as is appropriate. Upon the failure of one of the media stream processors 103 due to a malfunction or other circumstance, the channel redundancy controller 116 within the media stream controller 113 issues a command that is transmitted to the standby media stream processor 106 to stand in and handle the communications channels that were originally handled by the failed one of the media stream processors 103.

Figure 2:
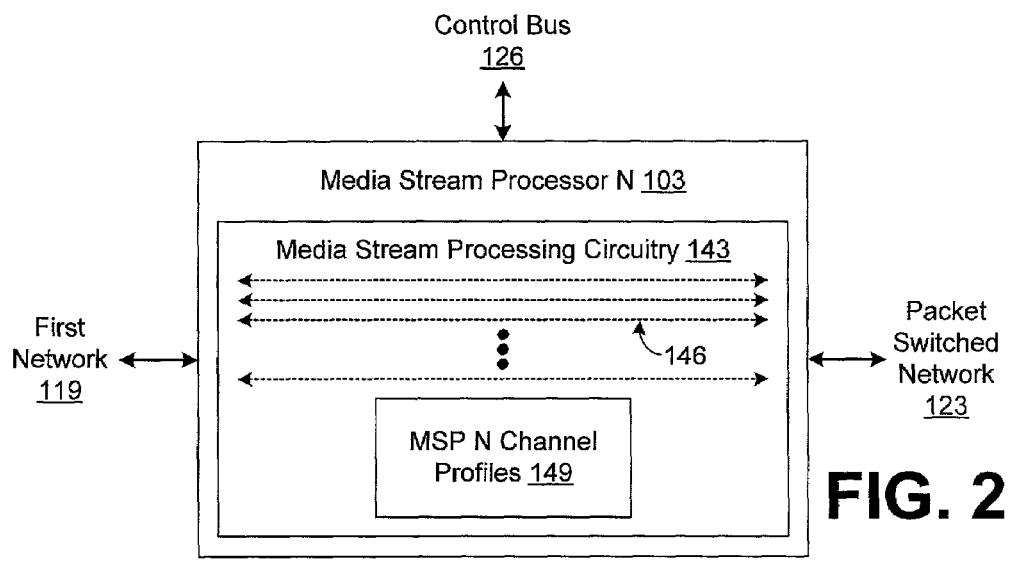
FIG. 2 is a block diagram of a media stream processor employed in the media stream processing system of FIG. 1.

With reference to FIG. 2, shown is a block diagram of an exemplary one of the media stream processors 103 according to an embodiment of the present invention. The media processor 103 includes media stream processing circuitry 143 that facilitates the brokering of a number of communications channels 146. The media stream processing circuitry 143 may be, for example, one or more processor circuits that are located on one or more integrated circuits as well as any dedicated logical circuitry. Specifically, each of the communication channels 146 includes the transfer of voice or data information between the first network 119 to the packet switched network 123. In such a transfer, each of the communications channels 146 includes circuitry that performs various translation operations as are necessary to provide a bridge between the first network 119 and the packet switched network 123. For example, one such translation operation(s) may be obtaining voice or data information from a TDM slot, formatting the voice or data information into packets to be transmitted over the packet switched network 123 and transmitting the packets to their destination. In such case the creation of the data packets may involve creation of a header with destination, address information and other information as can be appreciated by those with ordinary skill in the art.

For each one of the communications channels 146, the media stream processor 103 maintains a channel profile 149 in a memory associated with the media stream processor 103. Each of the channel profiles 149 includes a number of channel parameters that describe the nature of the respective communications channel 146. The channel parameters that make up the channel profiles 149 may include initial setup channel parameters and latent channel parameters. The initial setup channel parameters are those channel parameters that are specified so as initially to create the respective communication channel 146. The initial setup parameters may include, for example, a packet format employed by the packet switch to network 123, the packet size employed by the packet switched network 123, and/or a destination or origin of packets that are transmitted and received by way of the packet switched network 123. The initial setup parameters may also include various parameters associated with the first network 119. Assuming, for example, that the first network 119 employed TDM, then the initial setup parameters may include the source TDM slot, the destination TDM slot, and various TDM signaling parameters, etc. The initial setup parameters may also include echo cancellation parameters, voice compression schemes, tone detector setup parameters, jitter buffer setup parameters, or other parameters.

The latent channel parameters are those parameters that are determined after the initial setup of one of the communications channels 146. In this respect, a latent channel parameter might include, for example, a time delay of any echo canceler employed with the respective communication channel 146. Such a time delay may not be known during the initial startup, for example, of a telephone call until the echo canceler trains up. Also, the latent channel parameters may include various channel quality statistics gathered over the duration of the interrupted call, such as packet delays, lost packets and other statistics and parameters, etc.

Figure 3:
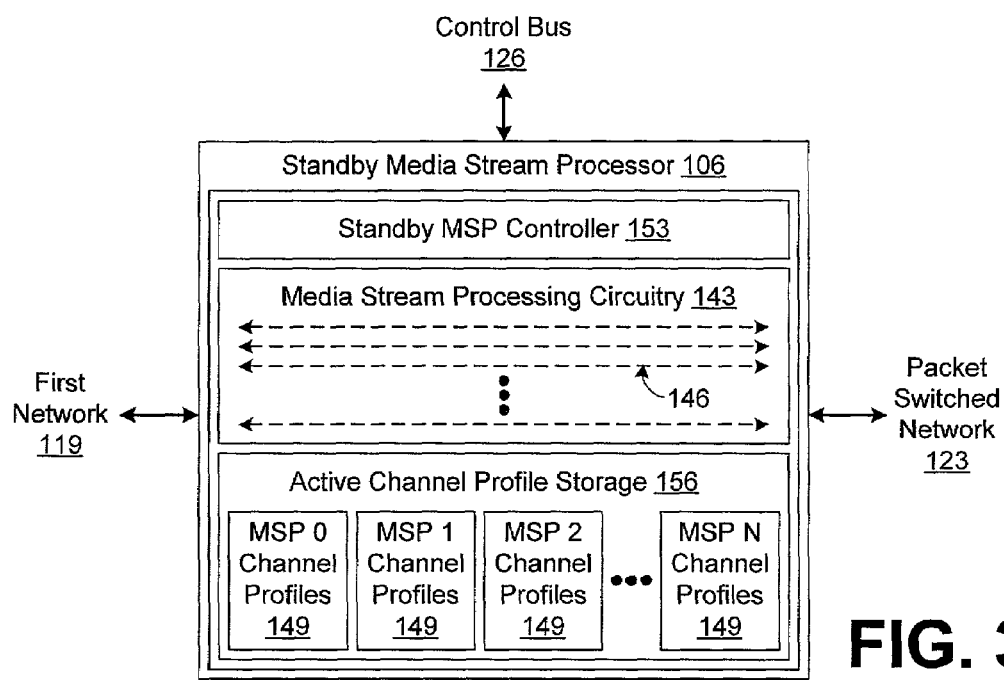
FIG. 3 is a block diagram of a standby media stream processor employed in the media stream processing system of FIG. 1.

With reference to FIG. 3, shown is a block diagram of the standby media stream processor 106 according to an embodiment of the present invention. The standby media stream processor 106 includes a standby media stream processor controller 153 and the media stream processing circuit 143 that facilitates a number of communication channels 146 similar to the media stream processors 103 (FIG. 2). The standby media stream processor 106 also includes an active channel profile storage 156 that may be, for example, a memory or other storage device. During operation, the standby media stream processor 106 stores the MSP channel profiles 149 of each of the communications channels 146 from each of the media stream processors 103. The stored MSP channel profiles 149 in the active channel profile storage 156 are used by the standby media stream processor 106 in standing in for a failed media stream processor 103 as will be discussed. The standby MSP controller 153 controls the operation of the standby media stream processor 106 in standing in for such a failed media stream processor 103 as will be discussed. The standby media stream processor 106 is also coupled to the first network 119 and to the packet switched network 123. In addition, a control bus 126 is included that couples the standby media stream processor 106 to the host 109 (FIG. 1) to receive commands and control messages therefrom.

With reference then to FIGS. 1, 2, and 3, next a discussion of the operation of the media stream processing system 100 is provided. To begin, the media stream processors 103 generally operate to broker the number of communications channels 146 between the first network 119 and the packet switched network 123. As stated before, each of the communications channels 146 is specified by one of the profiles 149 that lists a number of the channel parameters that describe the channel itself. When a new channel is established, the host 109 generates appropriate commands to one of the media stream processors 103 set up the communications channel 146 to route a particular telephone call or data stream from the first network 119 to the packet switched network 123. During the initial setup of such a telephone call or data stream, the media stream controller 113 in the host 109 may specify various initial setup parameters to be associated with the respective channel 146 during the brokering thereof by the media stream processor 103. For example, the host 109 may track the usage of various slots in a TDM bus, assuming the first network 119 was a TDM network. In such case, during the setup of a particular communications channel 146, the host 109 may inform the media stream processor 103 which slots were to be used as the source and destination of data communication, etc. In any event, many multiple communication channels 146 may be established on each one of the media stream processors 103.

At any given instant, a number of channel profiles 149 is maintained in the media stream processors 103 that describes each of the various communication channels 146 that are actively brokered by the respective media stream processor 103. The same profiles 149 are communicated to the standby media stream processor 106. Specifically, when sending appropriate commands to one of the media stream processors 103 for an initial setup of a communications channel 146 therein, the channel redundancy controller 116 may also send the same commands to the standby media stream processor 106. This task is performed so that the same channel profiles 149 may be stored in the active channel profile storage 156. Thus, at any given time, the profiles 149 of all of the communications channels 146 in each one of the media stream processors 103 is maintained both in the respective media stream processors 103 themselves as well as in the standby media stream processor 106.

In an alternative embodiment, to save bandwidth on the control bus 126, the channel redundancy controller 116 may not have to redundantly send channel parameters and commands, etc., to the standby media stream processor 106. In such case, the standby MSP controller 153 is configured to listen on the control bus 126 for such parameters that were transmitted from the host 109 to respective ones of the media stream processors 103. When such parameters and/or commands are issued by the host, the standby MSP controller 153 acquires the information and stores it in the appropriate channel profile 149 in the active channel profile storage 156. In such case the standby MSP controller 153 would include logic to ignore any command or parameter that is not to be stored in one of the profiles 149 stored in the active channel profile storage 156. At the same time, the standby MSP controller 153 includes logic to recognize those channel parameters that are to be included in one of the profiles 149 stored in the active channel profile storage 156. In this circumstance, the channel redundancy controller 116 includes logic that relays any latent channel parameters and other parameters that were not subject to acquisition by the standby MSP controller 153 off of the control bus 126 to the standby media stream processor 106.

During the normal operation, each of the media stream processors 103 brokers any number of communications channels 146. At this time, the channel redundancy controller 116 operates in an operating state in which the channel parameters are provided to the standby MSP controller 153 in the standby media stream processor 106 for storage in one of the profiles 149 in the active channel profile storage 156. When one of the media stream processors 103 experiences a failure such that it not longer can broker its communications channels 146, then the channel redundancy controller 116 enters an active standby state. In the active standby state the channel redundancy controller 116 issues one or more commands that are sent to the standby media stream processor 106 causing it to stand in for the failed media stream processor 103.

In response, the standby MSP controller 153 obtains the profile information 149 for the failed media stream processor 103 and proceeds to setup the same channels 146 described thereby in the media stream processing circuitry 143 of the standby media stream processor 106. The standby media stream processor 106 then proceeds to operate in the place of the media stream processor 103 that failed. The standby MSP controller 153 also sends an indication of the failure to operators who can then replace the failed MSP 103. The fact that the MSP channel profiles 149 are stored in the active channel profiles 156 allows the standby media stream processor 106 to transition into the role of one of the media stream processors 106 quickly and efficiently without a loss in the continuity of the communication channels 146 of the failed media stream processor 103.

Specifically, given that there may be hundreds if not thousands of communications channels 146 operated by any one of the media stream processors 103, it would take a significant period of time for the host 109 to access information and communicate it to the standby media stream processor 106. This period of time would result in an unacceptable disruption of the communication channels 146 themselves. However, given that the channel profiles 149 are maintained in the active channel profile storage 156, the host 109 is spared the task of communicating all of the channel parameters for each one of the profiles 149 of the failed media processor 103 directly to the standby media stream processor 106 upon the failure of the respective media stream processor 103. The same information may simply be accessed from the active channel profile storage 156.

Due to the storage of the profiles 149 of all of the media stream processors 103 in the active channel profile storage 156, redundancy is provided for all of the media stream processors 103 without requiring a redundant standby media stream processor for each one of the media stream processors 103. As such, a great savings in cost is realized. At the same time, the standby media processor 106 provides adequate redundancy for any failures that are experienced in the media stream processors 103 assuming that operators are attentive to resolve any problems experienced thereby before multiple ones of the media stream processors would fail at the same time. In an alternative setup, two or more standby media stream processors 106 may be employed so that double or greater redundancy is provided. There may be any ratio of media stream processors 103 to standby media stream processors 106.

In addition, in one embodiment, the standby media stream processor 106 includes enough memory to maintain the channel profiles 149 from each of the media stream processors 103 and to operate in the place of a failed one of the media stream processors 103 at the same time. In such case, the channel profiles 149 are maintained in the active channel profile storage 156 at all times via appropriate communication with the host 109. In an alternative embodiment, a limited amount of memory is provide such that the standby media stream processor 106 is only able to either maintain the channel profiles 149 from each of the media stream processors 103 or operate in place of a failed one of the media stream processors 103 at a given instant. That is to say, when one of the media stream processors 103 fails and the standby media stream processor 106 stands in for the failed media stream processor 103, the channel profiles 149 stored in the active channel profiled storage 156 are eliminated to provide memory for the operation of the communications channels 146.

When the failed media stream processor 103 is fixed, the standby media stream processor 106 transitions back to the standby operation. In doing so, all of the channel profiles 149 from each of the media stream processors 103 need to be relayed to the standby media stream processor 106 by the host 109. While this transition occurs, if a failure occurs in one of the media stream processors 103, the standby media stream processor 106 would attempt to stand in for the failed media stream processor 103. However, if some or all of the channel profiles 149 have not been stored in the active channel profile storage for the failed media stream processor 103, then it is possible that some of these active channels may be temporarily disrupted while such information is relayed to the standby media stream processor 106. In some situations, the channels may be lost where the host 109 can no longer access the channel profiles 149 from a failed media stream processor 103.

Figure 4:
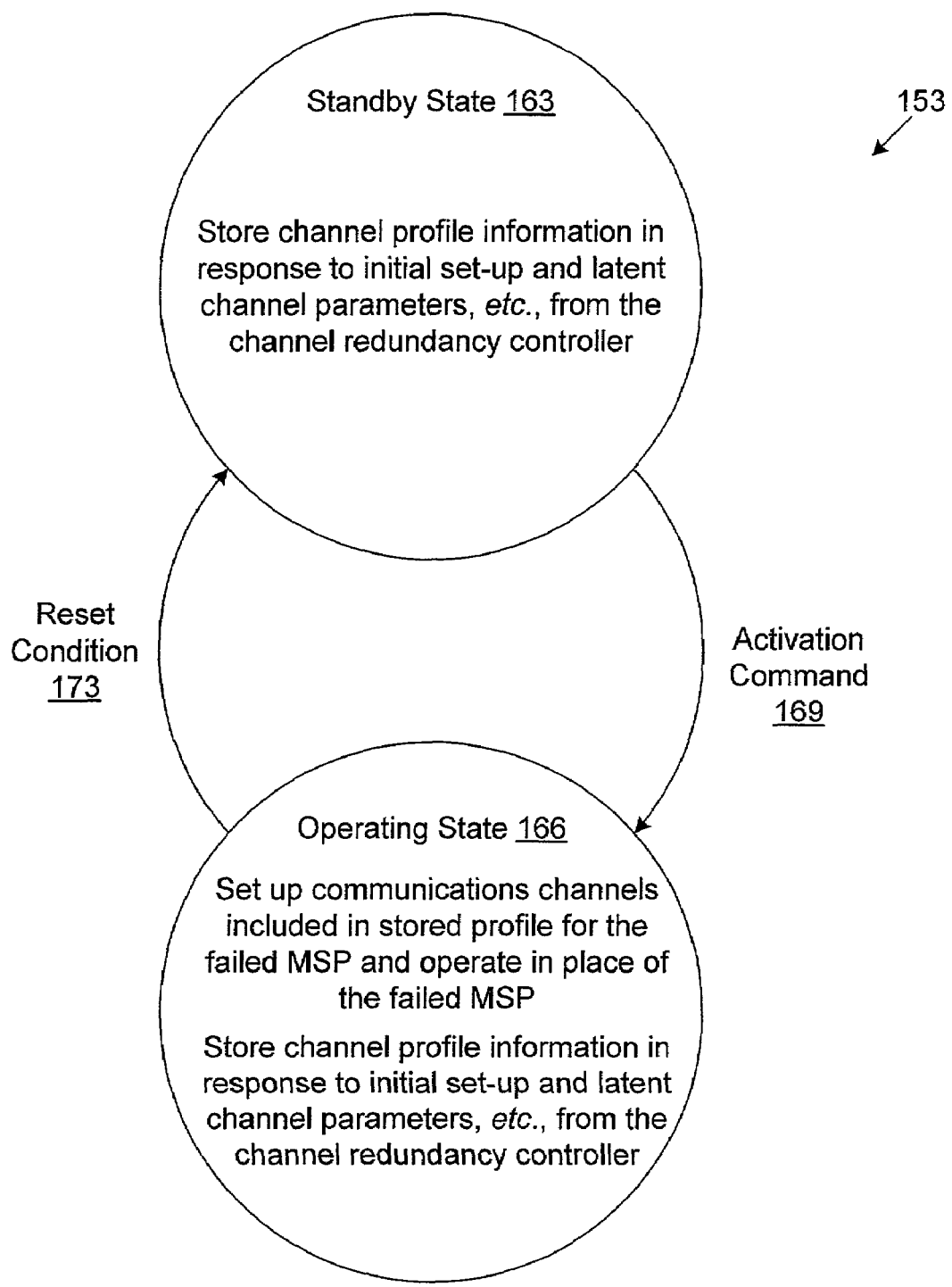
FIG. 4 is a state diagram of an exemplary standby switch controller implemented in the standby media stream processor of FIG. 3.

Turning then to FIG. 4, shown is an exemplary state diagram of the standby MSP controller 153 according to an embodiment of the present invention. Alternatively, the state diagram of FIG. 4 may be viewed as depicting various steps of a method implemented by the standby MSP controller 153. As shown the standby MSP controller 153 exists in one of at least two states. First is a standby state 163 and second is an operating state 166. In the standby state, the standby MSP controller 153 receives any profile information from the channel redundancy controller 116 (FIG. 1) relative to a respective channel 146 (FIG. 2). Specifically, such profile information may include initial setup parameters and latent parameters that are relayed by the channel redundancy control 116 from the media stream processors 103 (FIG. 1) to the standby media stream processor 106 (FIG. 1).

Alternatively, the standby MSP controller 153 may listen for and acquire those initial setup and latent parameters that are sent to the media stream processors 103 from the media stream controller 113 (FIG. 1) during the normal operation of the media stream processing system 100 (FIG. 1). This approach eliminates a need for the channel redundancy controller 116 to send redundant messages to the standby media stream processor 106 to store the channel profile information of the various profiles 149 in the active channel profile storage 156.

Assuming that one of the media stream processors 103 fails for one reason or another, then the channel redundancy controller 116 issues an activation command 169 to the standby MSP controller 153. The activation command 169 informs the standby media stream processor 106 that it is to stand in for a respective one of the media stream processors 103 that has experienced a failure. The activation command 169 includes a designator of the failed media stream processor 103 so that the standby media stream processor 106 may know which media stream processor 103 that it is replacing. Upon receiving the activation command 169, then the standby MSP controller 153 enters the operating state 166. In the operating state 166, the standby MSP controller 153 directs the setup and brokering of the communication channels 146 that were previously handled by the failed media stream processor 103 in the standby media stream processor 106. In this respect, the media stream processing circuitry 143 of the standby MSP controller 153 brokers the communications channels 146 previously brokered by the failed media stream processor 103.

Also, at the same time the standby MSP controller 153 continues to maintain the storage of the channel profiles 149 in the active channel profile storage 156. This includes maintaining the channel profiles 149 of the communications channels 146 brokered by each of the media stream processors 103 as well as maintaining the channel profiles 149 of the communications channels 149 temporarily brokered by the standby media stream processor 106. This ensures that the standby media stream processor 106 is able to stand in for any other media stream processor 106 at any time after the current failed media stream processor 103 has been repaired.

The standby media stream processor 106 then operates in the operating state 166 until a reset condition 173 is detected. Thereafter, the standby MSP controller 163 reverts back to the standby state 163. The reset condition 173 may be a manually generated signal, for example, caused by an action of an operator who manipulates an appropriate input device such as a push button or keyboard, etc. Alternatively, an automated signal may be generated by the act of replacement of the failed media stream processor 103, etc. Thereafter, the standby media stream processor 106 reverts back to the standby state 163 in which information on the various profiles 149 obtained from the channel redundancy controller 116 to store in the active channel profile storage 156 to await the next failure of a respective one of the media stream processors 103.

Figure 5:
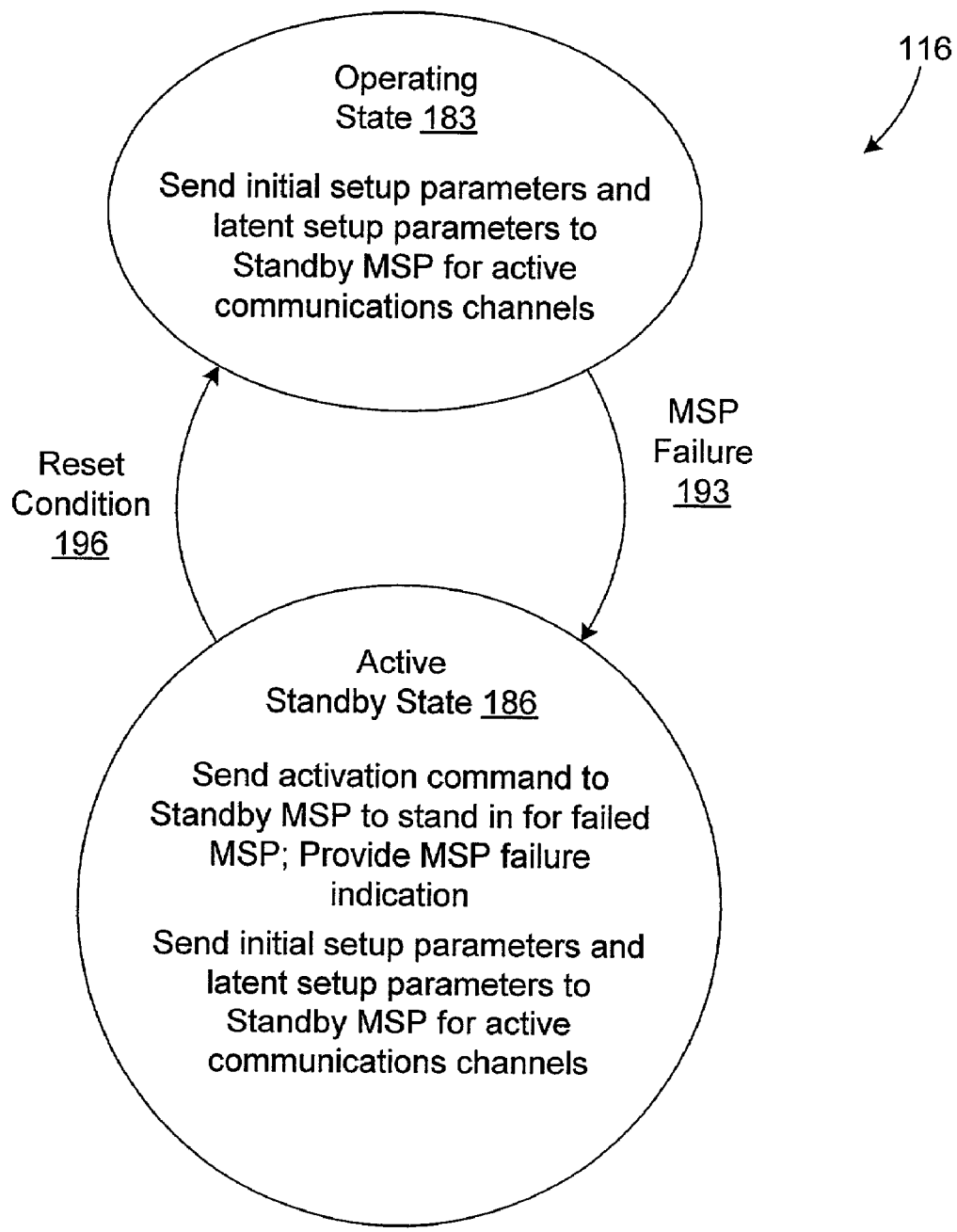
FIG. 5 is a state diagram of an exemplary channel redundancy controller implemented in a host in the media stream processing system of FIG. 1.

Referring next to FIG. 5, shown is an exemplary state diagram of the channel redundancy controller 116 according to an embodiment of the present invention. Alternatively, the state diagram of FIG. 5 may be viewed as depicting various steps of a method implemented by the channel redundancy controller 116.

In one embodiment, the channel redundancy controller 116 operates in two states, namely, an operating state 183 and an active standby state 186. In another embodiment, the channel redundancy controller 116 may include a third state referred to herein as a reset transition state (not shown). The channel redundancy controller 116 transitions from the operating state 183 to the active standby state 186 due to a media stream processor failure 193. The channel redundancy controller 116 transitions from the active standby state 186 back to the operating state 183 upon an occurrence of a reset condition 196.

In the operating state 183, the channel redundancy controller 116 obtains and sends initial setup parameters and latent parameters to the standby media stream processor 106. This is done during the normal operation of the media stream processing system 100 where communication channels 146 (FIG. 2) are setup and/or brokered by the media stream processors 103 in coordination with the media stream controller 113. Assuming that one of the media stream processors 103 fails, then the channel redundancy controller 116 enters the active standby state 186 in which the channel redundancy controller 116 sends an activation command to the standby media stream processor 106 to stand in for the failed media stream processor 103. The activation command includes the designation of the particular media stream processor 103 that has failed. The channel redundancy controller 116 also provides an indication to maintenance personnel of the failure of the particular media stream processor 103. Also, as an alternative, a failure indicator may be displayed as a portion of the media stream processors 103. At the same time, the channel redundancy controller 116 continues to obtain and send initial setup parameters and latent parameters to the standby media stream processor 106 for communications channels 146 (FIG. 2) brokered by the media stream processors 103.

The standby media stream processor 106 remains in the active standby state 186 standing in for the failed media stream processor 103 until the occurrence of the reset condition 196. As stated previously, the reset condition 196 may be generated manually or automatically as described previously. Upon an occurrence of the reset condition 196, the channel redundancy controller 116 reverts to the operating state 183. During the transition, the channel redundancy controller 116 may send a command, for example, to the standby media stream processor 103 that it should transition from the operating state 166 to the standby state 163.

In addition, the channel redundancy controller 116 may operate in a third state referred to as a reset transition state (not shown). This is done when there is not enough memory in the standby media stream processor 106 to concurrently maintain the channel profiles 149 of each of the media stream processors 103 and broker a number of communications channels 146 in the place of a failed media stream processor 103. In such case, upon an occurrence of a reset condition, the channel redundancy controller 116 enters the reset transition state. In the reset transition state all of the channel profiles 146 for the current active channels brokered by the all of the media stream processors 103 are obtained and relayed to the standby media stream processor 106 for storage in the active channel profile storage 156. This is done to reestablish the storage of the channel profiles 149 for use when the standby media stream processor 106 stands in for another failed media stream processor 103.

If one of the media stream processors 103 should fail while the channel redundancy controller 116 is in the reset transition state, then the channel redundancy controller 116 would revert back to the active standby state 186. In such case, it may be that certain communications channels 146 that were handled by the failed media stream processor 103 would be lost if the corresponding profiles 149 had not been reestablished in the active channel profile storage 156. However, due to the brief nature of the reset transition state, such an occurrence should be rare. Specifically, the reset transition state only lasts as long as it takes to restore the profiles 149 in the active channel profile storage 156. Such time period should be relatively short. Once the channel profiles 149 are reestablished in the active channel profile storage 156, then the channel redundancy controller 116 enters the operating state 183.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A media stream processing method, comprising:
   brokering a number of communications channels between a communications network and a packet switched network with a number of media stream processors, wherein each of the communications channels is specified by a profile having a number of channel parameters;
   storing each of the profiles in a standby media stream processor when each of the media stream processors is operational;
   brokering respective ones of the communications channels originally brokered by one of the media stream processors with the standby media stream processor upon a failure of the one of the media stream processors; and
   using the profiles associated with the respective ones of the communications channels stored in the standby media stream processor to establish the respective ones of the communications channels in the standby media stream processor.

2. The media stream processing method of claim 1, wherein each of the communications channels is employed in the transmission of a media stream.

3. The media stream processing method of claim 2, wherein the media stream comprises voice information.

4. The media stream processing method of claim 2, wherein the media stream comprises data.

5. A media stream processing method, comprising:
   brokering a number of communications channels between a communications network and a packet switched network with a number of media stream processors, wherein each of the communications channels is specified by a profile having a number of channel parameters;
   storing each of the profiles in a standby media stream processor when each of the media stream processors is operational;
   brokering respective ones of the communications channels originally brokered by one of the media stream processors with the standby media stream processor upon a failure of the one of the media stream processors; and
   generating a command to the standby media stream processor to stand in for one of the media stream processors upon a failure of the one of the media stream processors.

6. A media stream processing method, comprising:
   brokering a number of communications channels between a communications network and a packet switched network with a number of media stream processors, wherein each of the communications channels is specified by a profile having a number of channel parameters;
   storing each of the profiles in a standby media stream processor when each of the media stream processors is operational;
   brokering respective ones of the communications channels originally brokered by one of the media stream processors with the standby media stream processor upon a failure of the one of the media stream processors; and
   relaying the profiles from each of the media stream processors to the standby media stream processor with a host.

7. The media stream processing method of claim 6, wherein the relaying of the profiles from each of the media stream processors to the standby media stream processor with the host further comprises relaying at least one initial set-up one of the channel parameters to the standby media stream processor.

8. The media stream processing method of claim 7, wherein the relaying of the at least one initial set-up one of the channel parameters to the standby media stream processor further comprises relaying at least one initial set-up one of the channel parameters selected from the group consisting of a packet format parameter, a voice compression scheme employed by the communications channel, an echo cancellation parameter associated with an echo canceler employed by the communications channel, a time division multiplexing parameter, and any combination thereof.

9. The media stream processing method of claim 6, wherein the relaying of the profiles from each of the media stream processors to the standby media stream processor with the host further comprises relaying at least one latent one of the channel parameters to the standby media stream processor.

10. The media stream processing method of claim 9, wherein the relaying of the at least one latent one of the channel parameters to the standby media stream processor further comprises relaying a time delay associated with an echo canceler to the standby media stream processor.

11. A media stream processing system, comprising:
   a number of media stream processors, each of the media stream processors being configured to broker a number of communications channels between a communications network and a packet switched network, each of the communications channels including a profile having a number of channel parameters;
   a standby media stream processor associated with the media stream processors, the standby media stream processor having a standby mode in which the standby media stream processor maintains the profile for each of the communications channels;
   the standby media stream processor having an active mode in which the standby media stream processor stands in for one of the media stream processors to broker the communications channels brokered thereby upon a failure of the one of the media stream processors; and
   a host in data communication with each of the media stream processors and with the standby media stream processor, the host directing the standby media stream processor to stand in for the failing one of the media stream processors when the failure occurs.

12. The media stream processing system of claim 11, wherein the host relays the profiles from each of the media stream processors to the standby media stream processor.

13. The media stream processing system of claim 12, wherein the channel parameters further comprise at least one initial set-up parameter that is specified during an initial set-up of each of the communications channels and at least one latent channel parameter that is determined after the initial set-up of each of the communications channels.

14. The media stream processing system of claim 13, wherein the at least one initial set-up parameter is selected from the group consisting of a packet format parameter, a voice compression scheme employed by the communications channel, an echo cancellation parameter associated with an echo canceler employed by the communications channel a time division multiplexing parameter, and any combination thereof.

15. The media stream processing system of claim 13, wherein the at least one latent parameter further comprises a time delay associated with an echo canceler.

16. The media stream processing system of claim 13, wherein the host relays both the at least one initial set-up parameter and the at least one latent channel parameter associated with each profile in relaying each of the profiles from each of the media stream processors to the standby media stream processor.

17. The media stream processing system of claim 11, wherein each of the communications channels is employed in the transmission of a media stream.

18. The media stream processing system of claim 17, wherein the media stream comprises voice information.

19. The media stream processing system of claim 17, wherein the media stream comprises data.

20. A media stream processing system, comprising:
   multiple first means for brokering a number of communications channels between a communications network and a packet switched network, each of the communications channels including a profile having a number of channel parameters;
   a standby means for redundantly storing the profile for each of the communications channels and for brokering a portion of the communications channels originally brokered by one of the first means upon a failure within the one of the first means; and
   means for relaying the profiles from the multiple first means to the standby means.

21. The media stream processing system of claim 20, wherein each of the communications channels is employed in the transmission of a media stream.

22. The media stream processing system of claim 21, wherein the media stream comprises voice information.

23. The media stream processing system of claim 21, wherein the media stream comprises data.

24. A media stream processing system, comprising:
   multiple first means for brokering a number of communications channels between a communications network and a packet switched network, each of the communications channels including a profile having a number of channel parameters;
   a standby means for redundantly storing the profile for each of the communications channels and for brokering a portion of the communications channels originally brokered by one of the first means upon a failure within the one of the first means; and
   means for directing the standby means to broker the portion of the communications channels originally brokered by the one of the first means upon the failure within the one of the first means.

25. A media stream processing system, comprising:
   multiple first means for brokering a number of communications channels between a communications network and a packet switched network, each of the communications channels including a profile having a number of channel parameters;
   a standby means for redundantly storing the profile for each of the communications channels and for brokering a portion of the communications channels originally brokered by one of the first means upon a failure within the one of the first means; and
   wherein the channel parameters of the profiles further comprise at least one initial set-up parameter that is specified during an initial set-up of each of the communications channels and at least one latent channel parameter that is determined after the initial set-up of each of the communications channels.

26. The media stream processing system of claim 25, wherein the at least one initial set-up parameter is selected from the group consisting of a packet format parameter, a voice compression scheme employed by the communications channel, an echo cancellation parameter associated with an echo canceler employed by the communications channel, a time division multiplexing parameter, and any combination thereof.

27. The media stream processing system of claim 25, wherein the at least one latent parameter further comprises a time delay associated with an echo canceler.

28. A method for processing media streams, comprising:
   brokering a number of communications channels between a communications network and a packet switched network using at least one first media stream processor, wherein each of the communications channels is specified by a profile that includes a number of channel parameters;
   redundantly storing each of the profiles in a standby media stream processor for use in establishing at least a portion of the communications channels in the standby media stream processor upon a failure of the at least one first media stream processor; and using at least a portion of the profiles redundantly stored in the standby media stream processor to establish at least a corresponding portion of the communications channels in the standby media stream processor upon a failure occurring in the at least one first media stream processor.

29. The method for processing media streams of claim 28, wherein each of the communications channels is employed in the transmission of a media stream.

30. The method for processing media streams of claim 29, wherein the media stream comprises voice information.

31. The method for processing media streams of claim 29, wherein the media stream comprises data.

32. A method for processing media streams, comprising:

brokering a number of communications channels between a communications network and a packet switched network using at least one first media stream processor, wherein each of the communications channels is specified by a profile that includes a number of channel parameters;

redundantly storing each of the profiles in a standby media stream processor for use in establishing at least a portion of the communications channels in the standby media stream processor upon a failure of the at least one first media stream processor; and specifying a number of initial set-up ones of the channel parameters of the profile for each of the communications channels during an initial set up of each of the communications channels;

determining a number of latent ones of the channel parameters for each of the communications channels after the initial set-up of each of the communications channels, respectively; and wherein the redundant storing of each of the profiles in a standby media stream processor further comprises applying the initial set-up ones of the channel parameters and the latent ones of the channel parameters to the standby media stream processor for storage therein.

* * * * *